AMPLIFIER SYSTEM

Filed Sept. 16, 1947

INVENTORS
HENRI GEORGES DE FRANCE &
HERBERT ERNYEI
BY
Bailey, Stephens & Huettig
ATTORNEYS Patented Mar. 18, 1952

2,589,542

UNITED STATES PATENT OFFICE 2,589,542

AMPLIFIER SYSTEM

Henri Georges de France and Herbert Ernyei, Paris, France, assignors to "La Radio Industrie" S. A., Paris, France, a society of the Republic of France Application September 16, 1947, Serial No. 774,354
In France September 20, 1946

3 Claims. (Cl. 179—171)

Our invention relates to electromagnetic oscillation amplifier systems and more particularly to systems of this kind for very high frequencies and wide passing bands, in particular for television.

In such systems, it is necessary to ensure amplification with an attenuation lower than a given limit value, for instance 3 decibels, the side bands corresponding to 10 per cent of the carrier wave frequency.

It has been proposed to use either amplifier circuits modulated through the grid and including a damped circuit in the anode circuit, and neutrodined by capacitors between grid and anode, which leads to an insufficient amplification and output, or cathode excitation circuits neutralized by capacitor means inserted between cathode and anode, or again circuits also of the cathode excitation type but neutralized by self-induction means interposed between grid and earth (between grids for symmetrical circuits), which has the drawback of reducing damping of the anode circuit considered alone.

Our invention has chiefly for its object to provide amplifier systems of the kind above referred to which are better adapted to meet the various requirements of practice, in particular which permit of transmitting a wide band with an acceptable attenuation.

According to a feature of our invention, the amplifier includes a symmetrical amplifying stage which is neutralized by means of capacitors provided between filaments and grids.

Figure 1:
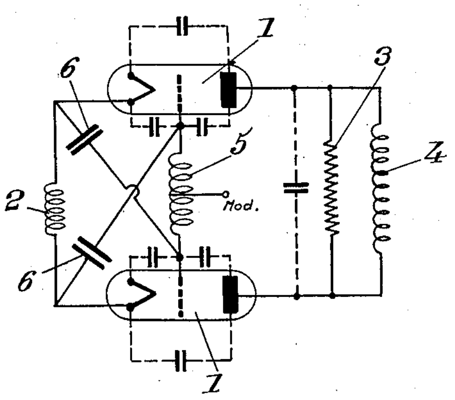
Figure 2:
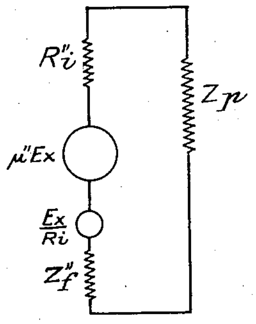

A preferred embodiment of our invention will be hereinafter described, with reference to the accompanying drawings, given merely by way of example, and in which:

Fig. 1 diagrammatically shows a symmetrical amplifier stage made according to our invention;

Fig. 2 is a corresponding diagram, relating to a single tube of this stage.

Figure 3:
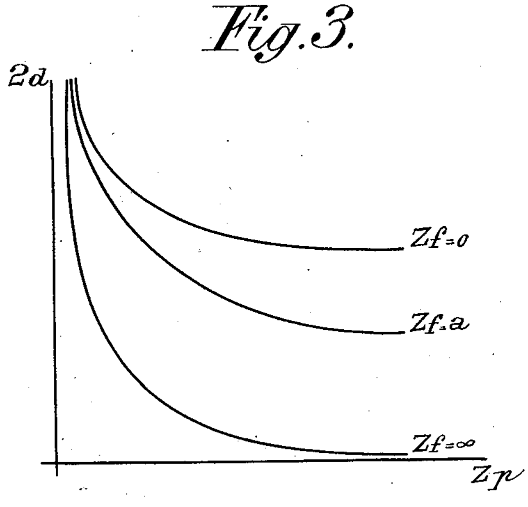

Finally, Fig. 3 shows a network of attenuation curves corresponding to this amplifier stage.

In the example shown, we connect the filaments of the two tubes 1 through a coupling impedance 2 of a value $Z_f$ and the plates through load impedance 3 of a value $Z_p$ and a resonance self inductance coil 4.

According to our invention, the grids are connected through a choke coil 5 which receives the modulation at its middle point and the amplifier stage is neutralized by means of capacitors 6 of a value $C_n$ inserted between grids and filaments, with a crossed arrangement.

Of course, there exist, in tubes 1, internal capacities, (shown in dotted lines) $C_{gf}$ between grids and filaments, $C_{gp}$ between grids and plates, and $C_{pf}$ between plates and filaments, and an internal resistance $R_i$.

We choose value $C_n$ as a function of the internal capacities of the tubes, to wit:

$$C_n=\frac{C_{gp}C_{gf}+C_{gp}C_{pf}+C_{fg}C_{fp}}{C_{gp}-C_{pf}}$$

and the capacity for the anode circuit in a neutralized system is:

$$C''=\frac{C_{fp}}{2}\left(1+\frac{1+2\frac{C_{gp}}{C_{pf}}}{1+2\frac{C_{gf}}{C_{gp}}}\right)$$

and therefore of low value, which has the effect of increasing the initial attenuation coefficient $$d''_0=\frac{1}{2Z_p}\sqrt{\frac{L}{C''}}$$

Examination of the equivalent diagram, relating to a single tube of the symmetrical system, shown by Fig. 2, brings forth the following equations:

$$Z''_f=Z_f\frac{M}{N}$$

$$\mu''=\frac{M-1}{N}$$

$$R''_i=\frac{R_i}{N}$$

$$S''=S(1-A)$$

$Z''_f$ : apparent cathodic impedance
$\mu''$ : apparent coefficient of amplification
$R''_i$ : apparent internal resistance of the tube
$S''$ and $S$ : apparent and true slopes of the tube with $$M=1+\mu(1-A)$$
$$N=1+\mu B$$

M and N are mere constants of the system, including A and B which are simple functions of the internal capacities of the tubes and $\mu$, to wit the static amplification coefficient $(R_i \times S)$; these two constants M and N are generally negative when neutralizing is ensured by means of a self inductance coil in the grid, because B is often higher than 0.1 in absolute value, and $\mu$ is equal approximately to 10, but in the circuit according to our invention, constant B becomes positive, therefore N also is positive and this gives for the attenuation (in a push-pull stage):

$$2d=2d''_0+\frac{|N|\sqrt{L/C''}}{R_i+M.Z_f}$$

It is possible to trace the system of attenuation curves giving $2d$ as a function of $Z_p$, with $Z_f$ as a parameter (Fig. 3).

The optimum resistance $Z_p$ which gives the maximum of power is:

$$Z_p(\text{optimum})=\frac{R_i+Z_f.M}{N}$$

If $Z_f$ is very small with respect to $R_i$, this load resistance is reduced to $$\frac{R_i}{N}$$

a value much lower than that obtained with conventional circuits, which ensures an improved out-put with a wider passing band, the efficiency of the system being independent of the frequency.

What we claim is:

1. An amplifier system which comprises, in combination, two amplifier tubes arranged in symmetrical fashion and including each an anode, a cathode and a grid, an input circuit on which wave energy may be impressed connected with said cathodes, a choke coil connected between said grids, a load circuit connected with said anodes, and neutralizing capacitors inserted in crossed fashion between the grid of each tube and the cathode of the other respectively.

2. An amplifier system which comprises, in combination, two amplifier tubes arranged in symmetrical fashion and including each an anode, a cathode and a grid, an input circuit on which wave energy may be impressed connected with said cathodes, a choke coil connected between said grids, adapted to receive modulation at its middle point, a load circuit connected with said anodes, and neutralizing capacitors inserted in crossed fashion between the grid of each tube and the cathode of the other respectively.

3. An amplifier system according to claim 1 in which the value $C_n$ of the capacity of each of said capacitors is given by the formula $$C_n=\frac{C_{gp}C_{gf}+C_{gp}C_{pf}+C_{gf}C_{pf}}{C_{gp}-C_{pf}}$$

in which $C_{gf}$ is the value of the internal capacity between grid and cathode of each of the amplifier tubes, $C_{gp}$ is the value of the internal capacity between grid and anode and $C_{pf}$ the value of the internal capacity between anode and cathode.

HENRI GEORGES DE FRANCE.
HERBERT ERNYEI.

REFERENCES CITED

The following references are of record in the file of this patent:

UNITED STATES PATENTS

| Number | Name | Date |
|---|---|---|
| 1,995,839 | Buschbeck | Mar. 26, 1935 |
| 2,057,998 | Bohm | Oct. 20, 1936 |
| 2,187,782 | Hardwick | Jan. 23, 1940 |
| 2,247,442 | Labin | July 1, 1941 |
| 2,281,345 | Willwacher | Apr. 28, 1942 |